(12) United States Patent
Lopatin et al.

(10) Patent No.: US 12,487,221 B2
(45) Date of Patent: Dec. 2, 2025

(54) VIBRONIC MULTISENSOR

(71) Applicant: Endress+Hauser SE+Co. KG, Maulburg (DE)

(72) Inventors: Sergey Lopatin, Lörrach (DE); Julia Rosenheim, Wehr (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 400 days.

(21) Appl. No.: 17/605,686

(22) PCT Filed: Mar. 31, 2020

(86) PCT No.: PCT/EP2020/059048
§ 371 (c)(1),
(2) Date: Oct. 22, 2021

(87) PCT Pub. No.: WO2020/216582
PCT Pub. Date: Oct. 29, 2020

(65) Prior Publication Data
US 2022/0146484 A1     May 12, 2022

(30) Foreign Application Priority Data
Apr. 26, 2019   (DE) ..................... 10 2019 110 821.7

(51) Int. Cl.
*G01N 33/14*      (2006.01)
*C12C 7/04*       (2006.01)
(Continued)

(52) U.S. Cl.
CPC ............. *G01N 33/143* (2013.01); *C12C 7/04* (2013.01); *G01N 9/24* (2013.01); *G01N 9/36* (2013.01);
(Continued)

(58) Field of Classification Search
CPC .......... G01N 33/143; G01N 9/24; G01N 9/36; G01N 29/024; G01N 29/4436;
(Continued)

(56) References Cited

U.S. PATENT DOCUMENTS 1,737,279 A * 11/1929 Wallerstein ............. C12C 7/047
435/93
4,262,523 A * 4/1981 Stansfeld ............... G01N 9/002
73/861.11
(Continued)

FOREIGN PATENT DOCUMENTS

CA         2837317 A1    6/2015
CN      101936953 A      1/2011
(Continued)

*Primary Examiner* — Tarun Sinha
(74) *Attorney, Agent, or Firm* — Kelly J. Smith; Endress+Hauser (USA) Holding, Inc.

(57) ABSTRACT

A method for determining and/or monitoring a concentration of maltodextrin and/or maltose in a mashing process comprises method steps as follows:
  providing a mash,
  heating the mash to at least one predeterminable temperature,
  determining the density of the mash
  determining the velocity of sound in the mash,
  ascertaining a concentration of maltodextrin and maltose in the mash, and
  ascertaining the concentration of maltodextrin and/or maltose in the mash.

4 Claims, 4 Drawing Sheets

(51) Int. Cl.
*G01N 9/24* (2006.01)
*G01N 9/36* (2006.01)
*G01N 29/024* (2006.01)
*G01N 29/44* (2006.01)

(52) U.S. Cl.
CPC ....... *G01N 29/024* (2013.01); *G01N 29/4436* (2013.01); *G01N 33/146* (2013.01); *G01N 2291/024* (2013.01); *G01N 2291/02809* (2013.01)

(58) Field of Classification Search
CPC ........... G01N 33/146; G01N 2291/024; G01N 2291/02809; G01N 2009/006; G01N 9/002; G01N 29/036; G01N 2291/022; G01N 29/222; G01N 2291/011; C12C 7/04; C12C 7/06
See application file for complete search history.

(56) References Cited

U.S. PATENT DOCUMENTS

| | | | |
|---|---|---|---|
| 5,359,541 A | | 10/1994 | Pope et al. |
| 5,369,600 A | | 11/1994 | Ito et al. |
| 6,279,378 B1 | * | 8/2001 | Sheen ................. G01N 29/024 73/24.01 |
| 2010/0083752 A1 | | 4/2010 | Malinek |
| 2014/0352427 A1 | | 12/2014 | Dreyer et al. |

FOREIGN PATENT DOCUMENTS

| | | |
|---|---|---|
| DE | 4023977 A1 | 2/1992 |
| DE | 4002108 C2 | 9/1993 |
| DE | 4437684 A1 | 4/1996 |
| DE | 19944047 A1 | 4/2001 |
| DE | 10035624 A1 | 2/2002 |
| DE | 102015112055 A1 | 1/2017 |
| DE | 102016109250 A1 | 11/2017 |
| EP | 3129460 B1 | 12/2017 |

* cited by examiner

VIBRONIC MULTISENSOR

CROSS-REFERENCE TO RELATED APPLICATIONS

The present application is related to and claims the priority benefit of German Patent Application No. 10 2019 110 821.7, filed on Apr. 26, 2019 and International Patent Application No. PCT/EP2020/059048, filed on Mar. 31, 2020, the entire contents of which are incorporated herein by reference.

TECHNICAL FIELD

The invention relates to a method for determining and/or monitoring a concentration of maltodextrin and/or maltose in a mashing process. The method can be performed, for example, by means of a device comprising a sensor unit having at least one mechanically oscillatable unit and at least one piezoelectric element.

BACKGROUND

For reliable monitoring of complex processes, simultaneous knowledge of the most varied of process variables is required. An example of such a process is a mashing process, which is applied, for example, in the brewing of beer.

In such case, by way of example, malt grist, which is produced from grain, especially barley, is soaked in water and heated. In this procedure, various substances in the malt, such as starch, proteins and even cell wall substances, are dissolved by various enzymatic, physical and chemical processes. For example, $\alpha$- and $\beta$-amylases split different starches, especially amylose and amylopectin, in the malt grist to maltose, dextrin and glucose; gluco-amylases, in contrast, split D-maltose to D-glucose.

Fundamentally, in the case of mashing, the goal is to set the temperature in such a manner that a high degree of saccharification of the starch into maltose is achieved. Therefore, processing is usually in a temperature range optimum for the $\alpha$- and $\beta$-amylases. The optimum temperature for $\alpha$-amylase lies at T<70° C., while that for $\beta$-amylase lies at T≈75° C., so that sequentially, in two working steps, two different temperatures must be set, in order to achieve a maximum possible degree of saccharification. In many cases, the presence of soluble amylose during and at the end of the mashing process is checked for via a refractometer measuring the index of refraction or via a manual iodine test. The time required for saccharification is, in such case, established, as a rule, empirically and not adapted to the actual happenings. It would be desirable to be able to determine the time periods for individual working steps exactly.

SUMMARY

An object of the invention is, thus, to provide an easy way to monitor how much saccharification has occurred in a mashing process.

The object is achieved by a method for determining and/or monitoring a concentration of maltodextrin and/or maltose in a mashing process, comprising method steps as follows
  providing a mash
  heating the mash to at least one predeterminable temperature
  determining the density of the mash
  determining the velocity of sound in the mash,
  ascertaining a concentration of maltodextrin and maltose in the mash, and
  ascertaining the concentration of maltodextrin and/or maltose in the mash.

Advantageously, the degree of conversion from maltodextrin to maltose can be determined based on the density and the velocity of sound. By continued determining of the concentrations of maltodextrin and/or maltose in the mash, the length of time for saccharification of the employed mash can be exactly determined. In this way, both plant availability as well as also energy required for mashing as well as quantities of steam required for maintaining temperature of the mash can be optimized.

In an embodiment of the method, the temperature of the mash is determined. The two variables, the density and the velocity of sound, are temperature dependent.

Thus advantageously, an influence of temperature is taken into consideration in the determining of density and/or velocity of sound. Especially, the influence of temperature can be compensated. In this way, the concentrations of maltose and/or of maltodextrin can be more reliably determined.

In an additional embodiment, the concentration of the sum of maltodextrin and maltose in the mash is ascertained based on density. The density gives information with reference to concentration, especially weight concentration, of the sum of maltodextrin and maltose in the mash. In this way, thus, the total concentration of the two substances in the mash can be ascertained.

In another embodiment of the method, the ratio of maltodextrin and maltose is ascertained based on the velocity of sound in the mash. The velocity of sound in the mash depends on the degree of transformation from maltodextrin into maltose.

In such case, the concentration of maltodextrin and/or maltose is advantageously ascertained based on the ratio.

It is, furthermore, advantageous that at least one value for the velocity of sound in the mash be compared with at least one reference value or with a value of a characteristic line for the velocity of sound of maltodextrin and/or maltose as a function of concentration of maltodextrin and/or maltose.

In an especially preferred embodiment of the method
  a sensor unit is excited by means of a excitation signal to execute mechanical oscillations,
  the mechanical oscillations are received by the sensor unit and converted into a first received signal,
  a transmitted signal is transmitted from the sensor unit and a second received signal received by the sensor unit, and
  density is ascertained based on the first received signal and velocity of sound is ascertained based on the second received signal.

A device suitable for performing a method of the invention is, for example, a vibronic sensor. Vibronic sensors are widely used in process and/or automation technology. In the case of fill level measuring devices, such have at least one mechanically oscillatable unit, such as, for example, an oscillatory fork, a single tine or a membrane. Such is excited during operation by means of a driving/receiving unit, frequently in the form of a electromechanical transducer unit, such that mechanical oscillations are executed. The electromechanical transducer unit can, in turn, be, for example, a piezoelectric drive or an electromagnetic drive. Corresponding field devices are produced by the applicant in great variety and sold, for example, under the marks, LIQUIPHANT and SOLIPHANT. The underpinning measuring principles are known, in principle, from a large number of publications. The driving/receiving unit excites the mechanically oscillatable unit by means of an electrical excitation signal, such that mechanical oscillations are performed. Conversely, the driving/receiving unit can receive the mechanical oscillations of the mechanically oscillatable unit and convert them into an electrical, received signal. The driving/receiving unit is correspondingly either a separate driving unit and a separate receiving unit, or a combined driving/receiving unit. For exciting the mechanically oscillatable unit, such that mechanical oscillations are executed, the state of the art provides the most varied of solutions, including both analog as well as also digital methods, such as described, for example, in DE102006034105A1, DE102007013557A1, DE102005015547A1, DE102009026685A1, DE102009028022A1, DE102010030982A1 or DE00102010030982A1.

Both the excitation signal as well as also the received signal are characterized by frequency ω, amplitude A and/or phase Φ. Correspondingly, changes in these variables are usually taken into consideration for determining the particular process variable. The process variable can be, for example, a fill level, a predetermined fill level, or the density or viscosity of the medium, as well as its flow. In the case of a vibronic limit level switch for liquids, it is distinguished, for example, whether the oscillatable unit is covered by the liquid or freely oscillating. These two states, the free state and the covered state, are distinguished, in such case, for example, based on different resonance frequencies, thus, based on a frequency shift. The density and/or viscosity can, in turn, only be ascertained with such a measuring device, when the oscillatable unit is covered by the medium. In connection with determining the density and/or viscosity, likewise different options are described in the state of the art, such as, for example, those published in DE10050299A1, DE102007043811A1, DE10057974A1, DE102006033819A1, DE102015102834A1 or DE102016112743A1.

Moreover, known from the German patent application No. 102018127526.9 (unpublished as of the earliest filing date of this application) is a vibronic multi-sensor, by means of which both the vibronic measuring principle as well as also the ultrasonic, measuring principle can be used for determining and/or monitoring one or more process variables. With such a sensor, both the density as well as also the velocity of sound can be ascertained. If the sensor includes supplementally a temperature sensor, then also the temperature of the mash can be determined by means of the same measuring device. Comprehensive reference is taken to this patent application in the context of the invention.

It is noted, however, that, in other embodiments, the individual process variables can also be determined, at least partially, by different measuring devices. For example, a separate temperature sensor can be used for determining the temperature. And, the density and the velocity of sound can be ascertained independently of one another.

BRIEF DESCRIPTION OF THE DRAWINGS

The invention will now be explained in greater detail based on the appended drawing, the figures of which show as follows.

Figure 1:
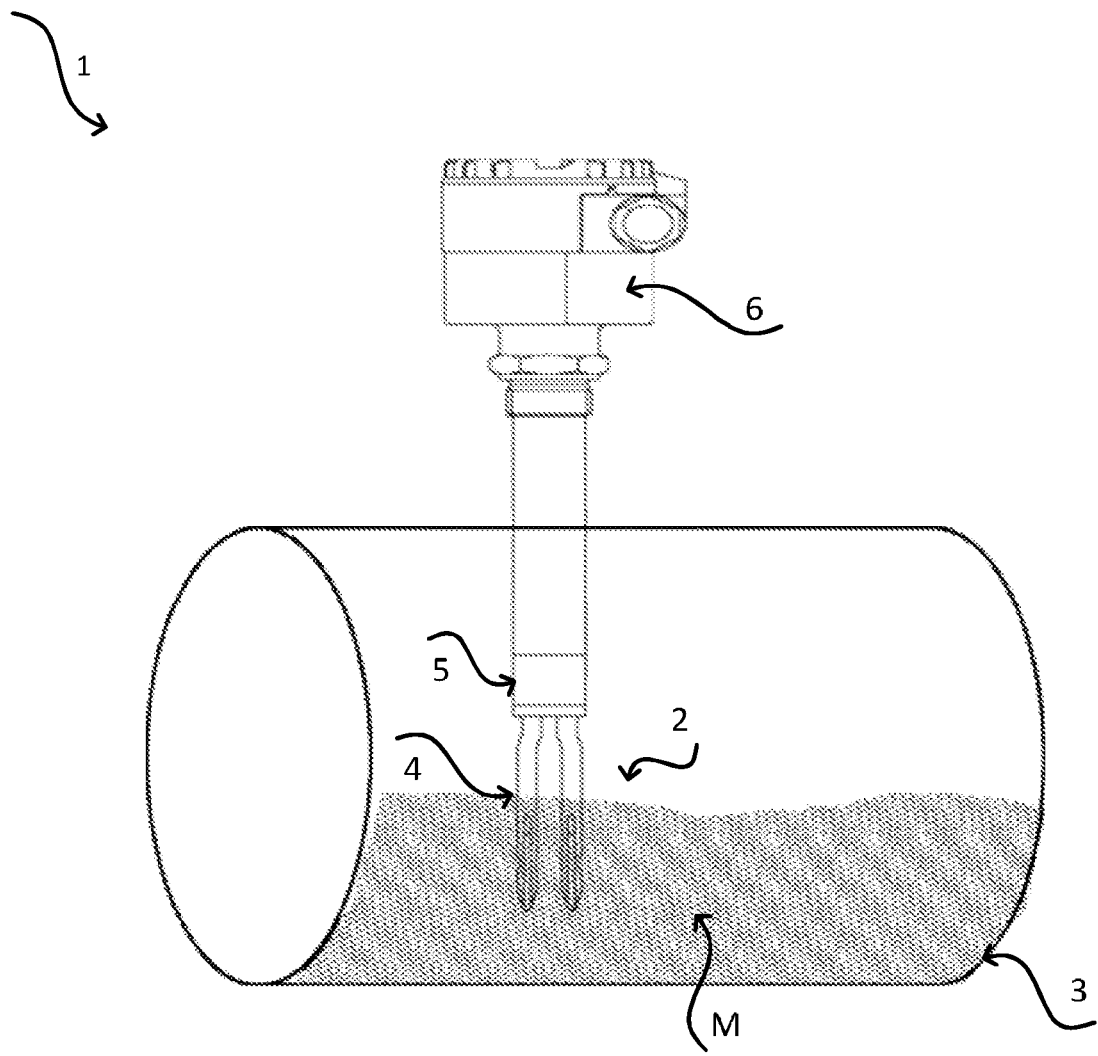
FIG. 1 shows a schematic view of a vibronic sensor according to the state of the art.

In the figures, equal elements are provided with equal reference characters.

DETAILED DESCRIPTION

Without intending to limit the general applicability of the invention, the following description concerns the case, in which a vibronic sensor 1 is used for performing the method of the invention.

FIG. 1 shows a vibronic sensor 1 having a sensor unit 2. The sensor has a mechanically oscillatable unit 4 in the form of an oscillatory fork, which is partially immersed in a medium M located in a container 3. The oscillatable unit 4 is excited by means of the exciter/receiving unit 5, such that the oscillatable unit 4 executes mechanical oscillations, and can be, for example, a piezoelectric stack- or bimorph drive. Other vibronic sensors use, for example, electromagnetic driving/receiving units 5. It is possible to use a single driving/receiving unit 5, which serves both for exciting the mechanical oscillations as well as also for their detection. Likewise, it is an option to implement a separate driving unit and a separate receiving unit. FIG. 1 shows, furthermore, an electronics unit 6, by means of which signal registration,—evaluation and/or—feeding occurs.

Figure 2A:
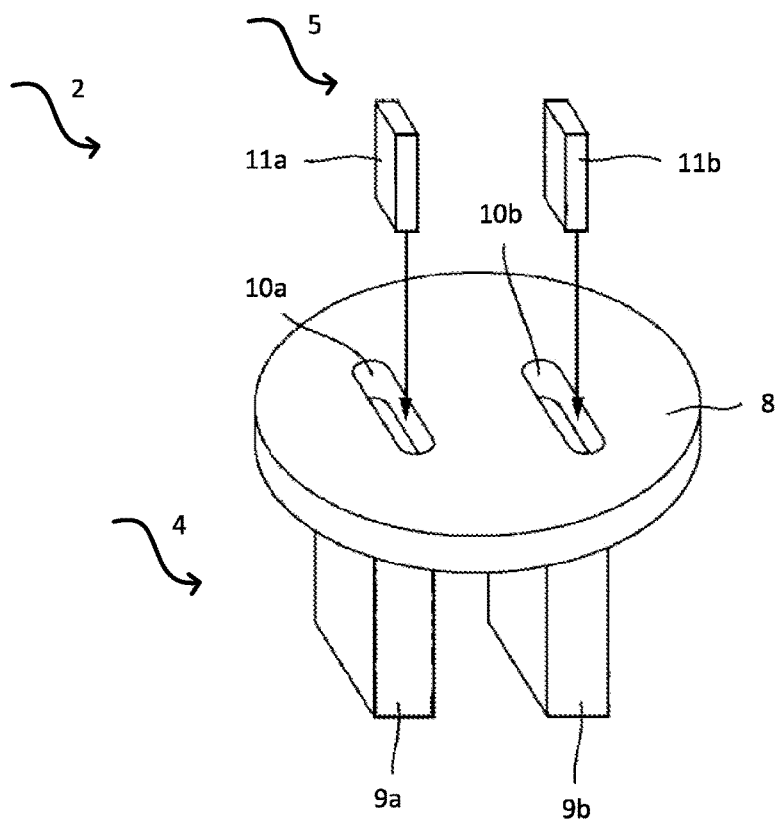
FIGS. 2a, 2b show two possible embodiments known per se in the state of the art for a sensor unit suitable for performing the method of the present disclosure.

Shown in FIG. 2a, by way of example, are two different sensor units 2, which are especially suitable for performing a method of the invention. The mechanically oscillatable unit 4 includes, applied on a base 8, two oscillatory elements 9a,9b, which are also referred to as fork tines. Optionally, moreover, in each case, a paddle (not shown) can be formed at the ends of the two oscillatory elements 9a,9b. Provided in each of the two oscillatory elements 9a,9b is, in each case, an, especially pocket-like, hollow space 10a, 10b, in which, in each case, at least one piezoelectric element 11a, 11b of the driving/receiving unit 5 is arranged. Preferably, the piezoelectric elements 11a and 11b are cast within the hollow spaces 10a and 10b. The hollow spaces 10a, 10b can, in such case, be so created that the two piezoelectric elements 11a, 11b are located completely or partially in the region of the two oscillatory elements 9a, 9b. Such an arrangement as well as similar arrangements are described at length in DE102012100728A1.

Figure 2B:
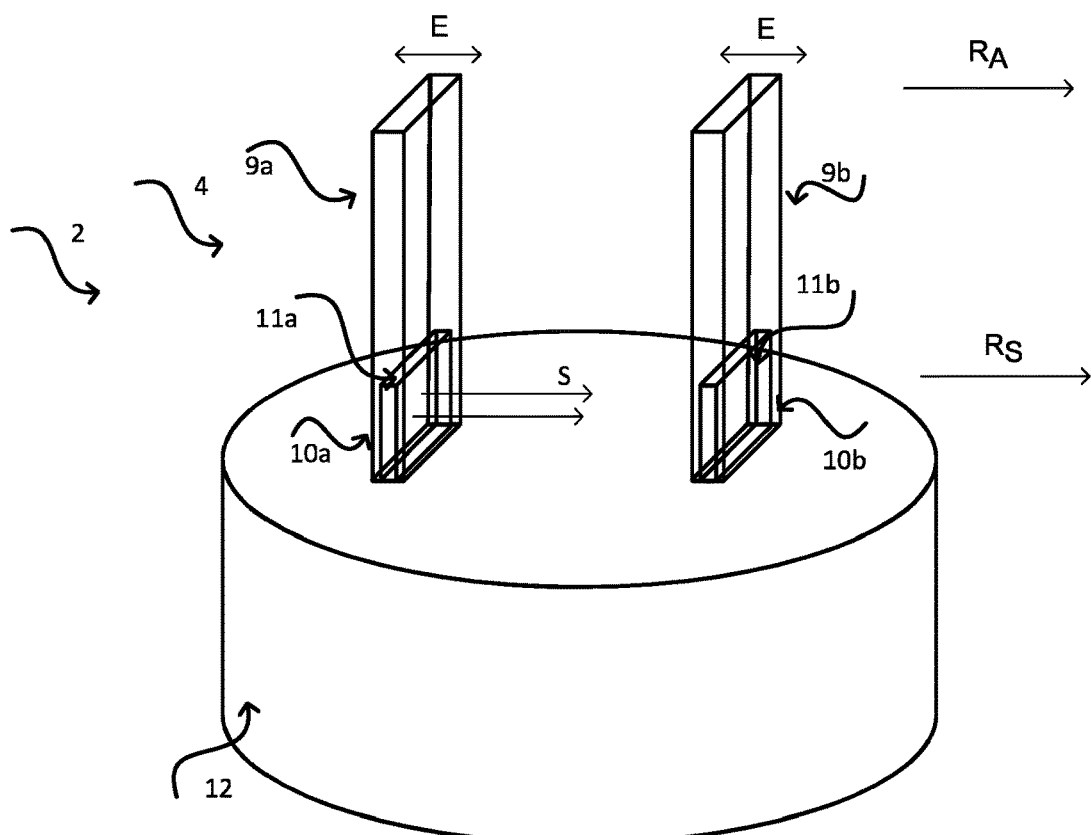

Another example of a possible embodiment of a sensor unit 2 is shown in FIG. 2b. The mechanically oscillatable unit 4 in such case includes two parallel, rod shaped, oscillatory elements 9a, 9b, which are mounted on a disc shaped element 12 and which can be excited separately from one another to execute mechanical oscillations, and in the case of which the oscillations can likewise be received and evaluated separately from one another. The two oscillatory elements 9a and 9b have, in each case, a hollow space 10a and 10b, into which, in each case, at least one piezoelectric element 11a, 11b is arranged in the region facing the disc shaped element 12. Regarding the embodiment of FIG. 2b reference is made, in turn, furthermore, to German patent application No. 102017130527.0, which was unpublished as of the earliest filing date of this application.

As shown schematically in FIG. 2b, according to the invention, the sensor unit 2 is, on the one hand, supplied with an excitation signal E, in such a manner that the oscillatable unit 4 is excited such that mechanical oscillations are executed. The oscillations are produced, in such case, by means the two piezoelectric elements 11a and 11b. The two piezoelectric elements can be supplied with the same excitation signal E or the first oscillatory element 11a can be supplied with a first excitation signal $E_1$ and the second oscillatory element 11b with a second excitation signal $E_2$. Likewise, an option is that a first received signal $R_E$ is received based on the mechanical oscillations, or that separate received signals $R_{E1}$, $R_{E2}$ are received from each of the oscillatory elements 9a, 9b.

Moreover, transmitted from the first piezoelectric element 11a is a transmitted signal S, which is received by the second piezoelectric element 11b in the form of a second received signal $R_S$. Since the two piezoelectric elements 11a and 11b are arranged at least in the region of the oscillatory elements 9a and 9b, the transmitted signal S passes through the medium M when the sensor unit 2 is in contact with the medium M and is correspondingly influenced by the properties of the medium M. Preferably, the transmitted signal S is an, especially pulsed, ultrasonic signal, especially at least one ultrasonic pulse. Likewise, it is, however, also an option that the transmitted signal S from the first piezoelectric element 11a is transmitted in the region of the first oscillatory element 9a and reflected on the second oscillatory element 9b. In such case, the second received signal $R_S$ is received by the first piezoelectric element 11a. The transmitted signal S passes, in this case, twice through the medium M, this leading to a doubling of a travel time τ of the transmitted signal S and an increasing of the accuracy of measurement with reference to the determining of the velocity of sound.

The first $R_E$ and second $R_S$ received signals result from different measuring methods and can be evaluated independently of one another relative to different process variables $P_1$ and $P_2$, in the present case, the density ρ and the velocity of sound v.

An embodiment for the method of the invention is, finally, shown by way of example in FIG. 3.

Figure 3A:
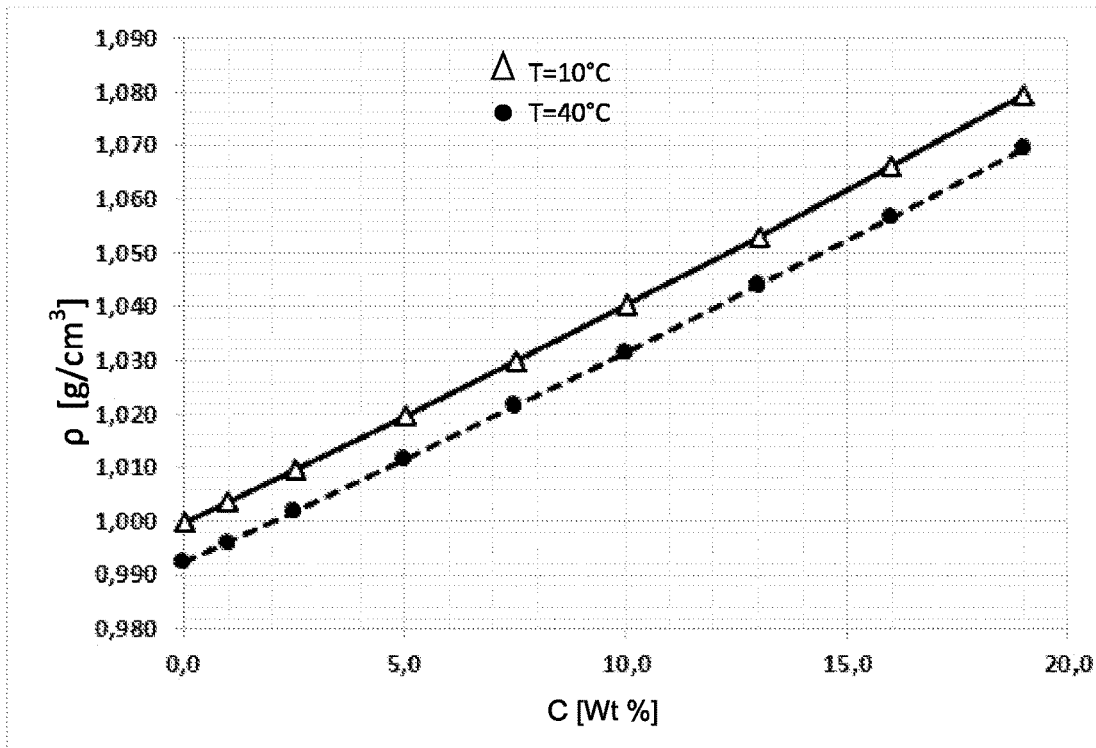
FIGS. 3a, 3b, and 3c show a view of a possible embodiment of the method of the present disclosure.
Figure 3B:
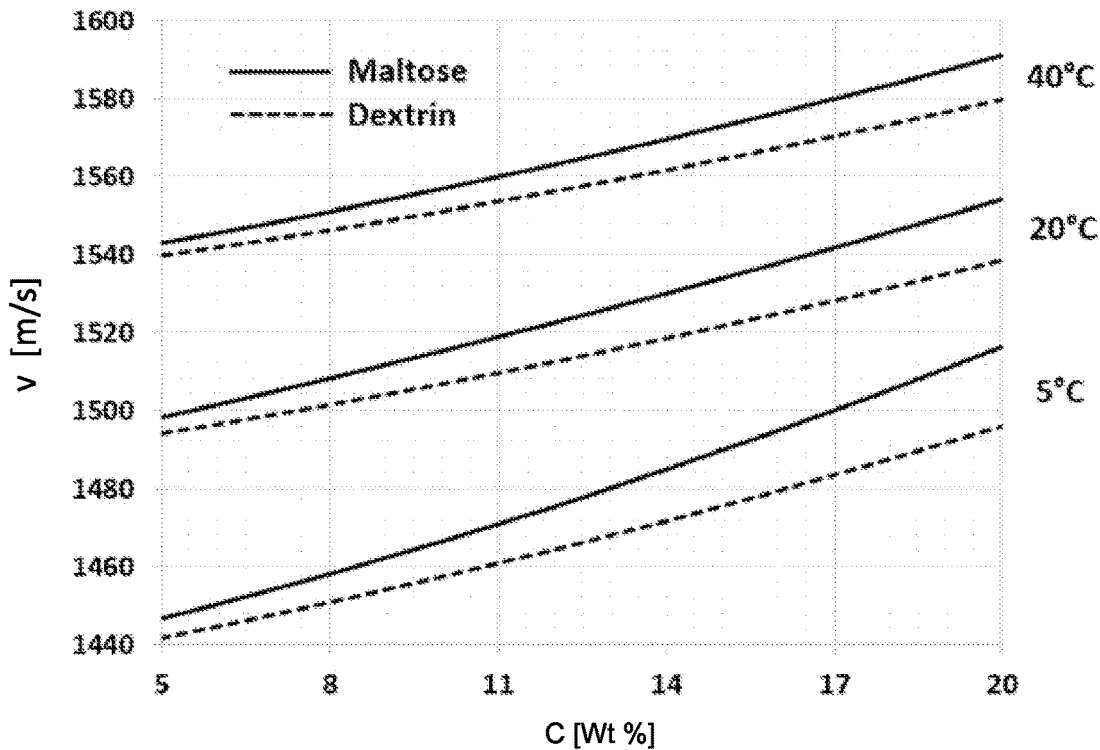
Figure 3C:
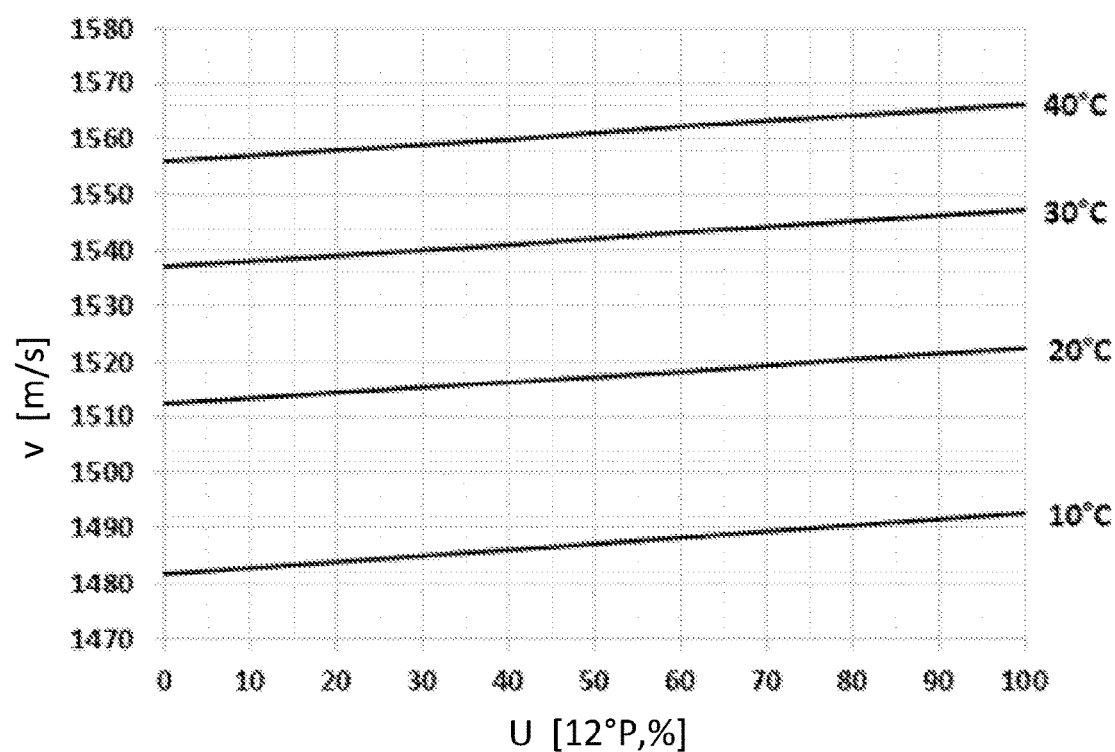

FIG. 3a shows the density ρ and FIG. 3b the velocity of sound v of maltose and dextrin in a mash at different temperatures T, in each case, as a function of concentration C. The density ρ of the mash is a measure for the total concentration of maltose and dextrin in the mash. The density ρ is, however, independent of the degree of conversion. This does not hold, however, for the velocity of sound v. Here, there is a clear dependence on the ratio of maltose and dextrin.

Furthermore, the density ρ and the velocity of sound v are temperature dependent. An additional determining of the temperature T of the mash is accordingly advantageous.

The density ρ in the case of application of a vibronic sensor 1 shown in FIG. 2 can be determined, for example, based on the following formula:

$$\rho = \frac{1}{S} \cdot \left[ \left( \frac{F_0}{F_{Med}} \right)^2 - 1 \right]$$

In such case, $F_{Med}$ is the oscillation frequency of the oscillatable unit 4 in the medium M, $F_0$ is the reference frequency of the oscillatable unit 4 in vacuum, or in air, and S describes the sensitivity of the sensor unit 2. The oscillation frequency of the oscillatable unit 4 in the medium M, $F_{Med}$, can be directly ascertained based on the first received signal $R_E$.

The velocity of sound v of the medium M can, in turn, be ascertained from the separation L between the first 11a and second 11b piezoelectric elements (which serve as transmitting unit and receiving unit) and the travel time τ of the transmitted signal S from the first 11a to the second piezoelectric element 11b, according to the following formula:

$$v = \frac{L}{\tau}$$

For executing the embodiment of the method of the invention shown here by way of example, the total concentration of maltose and dextrin in the mash is ascertained based on the density ρ and the temperature T. Then, a value for the velocity of sound is determined and compared with the characteristic lines shown in FIG. 3c. The characteristic lines show here, by way of example, the velocity of sound v in the mash as a function of the degree of transformation U, thus, of the ratio of maltose and dextrin in the mash for a Plato-concentration of 12° P. The characteristic line, which is taken into consideration for the comparison, is, thus, selected as a function of total concentration and temperature.

The invention claimed is:

1. A method for determining and/or monitoring a concentration of maltodextrin and/or maltose in a mashing process, comprising:
   providing a mash;
   heating the mash to at least one predeterminable temperature;
   determining the density of the mash;
   determining the velocity of sound in the mash;
   ascertaining a concentration of the sum of maltodextrin and maltose in the mash based on the density;
   ascertaining a ratio of maltodextrin and maltose based on the velocity of sound; and
   ascertaining the concentration of maltodextrin or the concentration of maltose based on the ratio;
   wherein
   a sensor unit is excited by means of a excitation signal to execute mechanical oscillations,
   the mechanical oscillations are received by the sensor unit and converted into a first received signal,
   a transmitted signal is transmitted from the sensor unit and a second received signal received by the sensor unit, and
   density is ascertained based on the first received signal and velocity of sound is ascertained based on the second received signal;
   wherein the mechanical oscillations and the transmitted signal are produced by the same piezoelectric element of the sensor unit;
   wherein the first received signal and the second received signal are different signals.

2. The method as claimed in claim 1, further comprising: determining a temperature of the mash.

3. The method as claimed in claim 2, wherein an influence of temperature is taken into consideration in determining density and/or velocity of sound.

4. The method as claimed in claim 1, further comprising: comparing at least one value for the velocity of sound in the mash with at least one reference value or with a value of a characteristic line for the velocity of sound of maltodextrin and/or maltose as a function of concentration of maltodextrin and/or maltose.

* * * * *